United States Patent
Kogan

(10) Patent No.: US 7,257,429 B2
(45) Date of Patent: Aug. 14, 2007

(54) OVERHEATING AND SPILL RESISTANT MOBILE DEVICE DOCKING CRADLE

(75) Inventor: Eduard M. Kogan, Howard Beach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 185 days.

(21) Appl. No.: 11/128,911

(22) Filed: May 13, 2005

(65) Prior Publication Data

US 2006/0258409 A1 Nov. 16, 2006

(51) Int. Cl.
*H04B 1/38* (2006.01)
*H04M 1/00* (2006.01)

(52) U.S. Cl. .................. 455/573; 455/575.1; 455/90.3; 455/550.1; 455/569.3; 320/114

(58) Field of Classification Search ................ 455/573, 455/575.1, 90.3, 550.1, 569.3
See application file for complete search history.

(56) References Cited

U.S. PATENT DOCUMENTS

2001/0029195 A1* 10/2001 Lin ............................. 455/573
2005/0168191 A1* 8/2005 Lee et al. .................... 320/114

* cited by examiner

*Primary Examiner*—Nick Corsaro
*Assistant Examiner*—Sylvia Mack
(74) *Attorney, Agent, or Firm*—Fay Kaplun & Marcin, LLP

(57) ABSTRACT

A docking station for a portable electronic device comprises a device receiving recess including a device receiving bottom surface and at least one device guiding structure sized to slidingly receive therein a device to be docked in the docking station and to guide the device toward, and maintain the device in, a desired position within the device receiving recess in which an electrical connector of the device mates with an electrical connector of the docking station and a well formed in the bottom surface of the device receiving recess, the well extending downward from the electrical connector of the docking station to a drainage opening formed at a lower-most point of the well in combination with a first lumen extending from the drainage opening to an outlet at an exterior of the docking station.

9 Claims, 2 Drawing Sheets

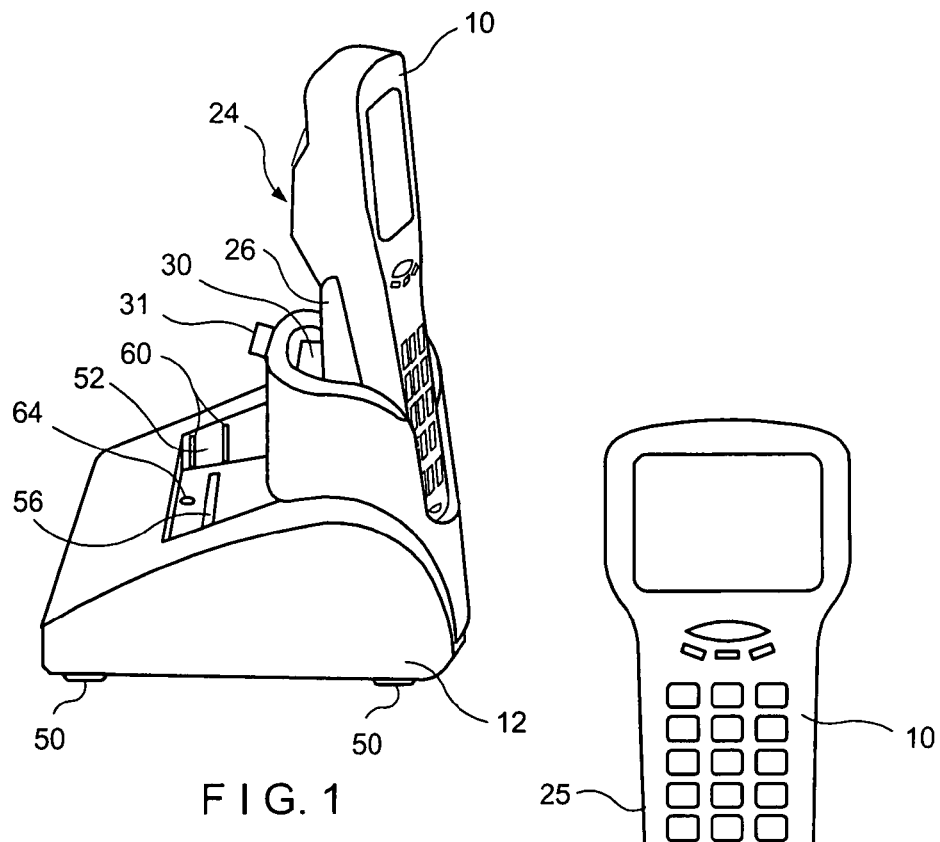
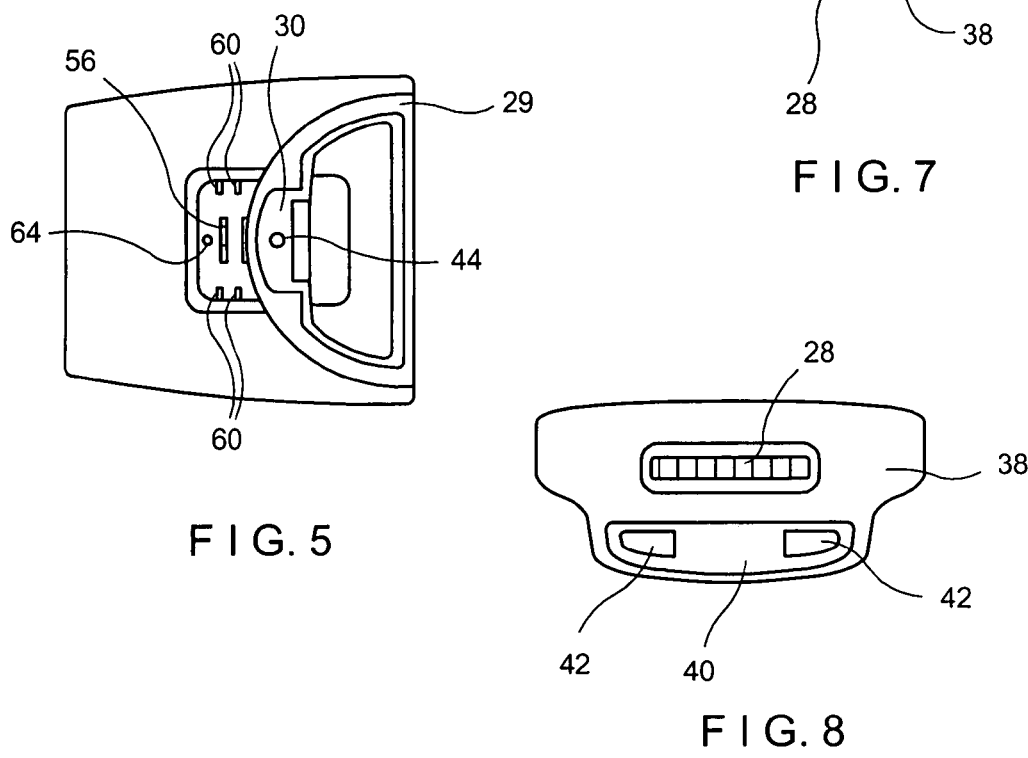

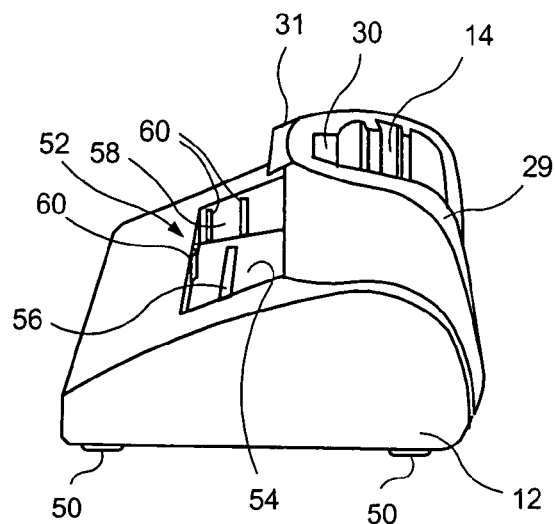
F I G. 2
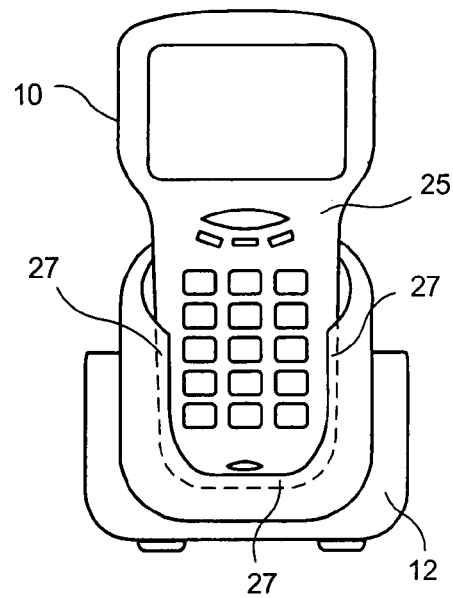
F I G. 4
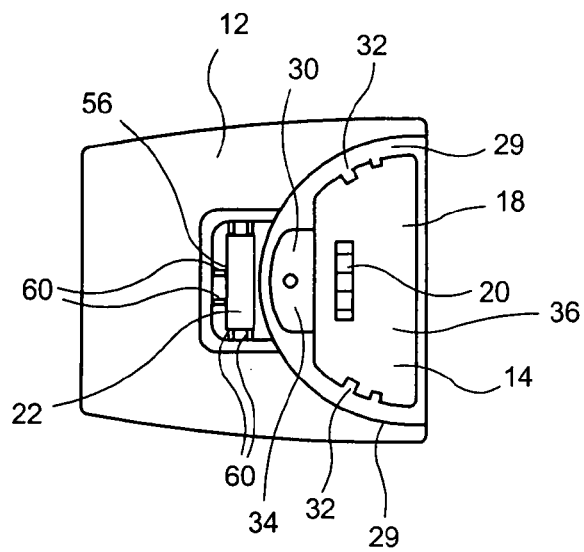
F I G. 3
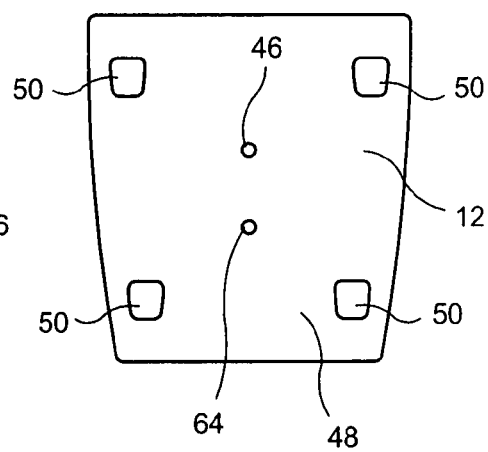
F I G. 6

OVERHEATING AND SPILL RESISTANT MOBILE DEVICE DOCKING CRADLE

BACKGROUND

As mobile computing devices are more and more heavily relied on, minimizing device downtime has become increasingly important. However, battery life remains limited and the recharging process is a periodic and unavoidable source of downtime. In addition, over time employees increasingly take these devices for granted and spills and other accidents further increase device downtime. As businesses become more reliant on these devices, the negative impact of downtime due to recharging and accidents, etc. is increased.

SUMMARY OF THE INVENTION

The present invention is directed to a docking station for a portable electronic device including a rechargeable battery, the docking station comprising a device receiving recess including a device receiving bottom surface and at least one device guiding structure sized to slidingly receive therein a device to be docked in the docking station and to guide the device toward, and maintain the device in, a desired position within the device receiving recess and an air flow channel which, when a device is received within the device receiving recess, is adjacent to a battery of the device, the air flow channel extending from an open top end to the device receiving bottom surface in combination with a first lumen extending through the device receiving bottom surface to establish fluid communication between the air flow channel and an exterior of the docking station.

The present invention is further directed to a docking station for a portable electronic device comprising a device receiving recess including a device receiving bottom surface and at least one device guiding structure sized to slidingly receive therein a device to be docked in the docking station and to guide the device toward, and maintain the device in, a desired position within the device receiving recess in which an electrical connector of the device mates with an electrical connector of the docking station in combination a well formed in the bottom surface of the device receiving recess, the well extending downward from the electrical connector of the docking station to a drainage opening formed at a lower-most point of the well in combination with a first lumen extending from the drainage opening to an outlet at an exterior of the docking station.

BRIEF DESCRIPTION OF THE DRAWINGS

FIG. 1 shows a perspective view of a docking station according to the present invention with a mobile device inserted therein;

FIG. 2 shows a perspective view of the docking cradle of FIG. 1 with no device received therein;

FIG. 3 shows a top view of the mobile device of FIG. 1 with a battery received in a battery charging station thereof;

FIG. 4 shows a front view of the a docking station of FIG. 1 with the mobile device of FIG. 1 received therein;

FIG. 5 shows a top view of the docking station of FIG. 1 with the mobile device inserted therein;

FIG. 6 shows a bottom view of the docking station of FIG. 1; and

FIG. 7 shows a front view of the mobile device of FIG. 1; and

FIG. 8 shows a bottom view of the mobile device of FIG. 1.

DETAILED DESCRIPTION

The present invention may be further understood with reference to the following description and the appended drawings, wherein like elements are referred to with the same reference numerals. The present invention will be described in regard to docking stations for personal digital assistants ("PDA's"). However, those skilled in the art will understand that the docking cradle according to the present invention is equally suited for any mobile electronic device relying on a rechargeable battery.

As shown in FIGS. 1 to 8, a mobile device, in this case a PDA 10, is received within a first recess 14 of a docking station 12 according to the invention with a bottom surface 38 of the PDA 10 including a connector 28 thereof facing a lower-most surface 18 of the recess 14. The lower-most surface 18 includes a power/data connector 20 sized and shaped to mate with the connector 28 of the PDA 10. The PDA 10 includes a battery 22 received within a battery receiving recess (not shown) in a rear portion 24 of the PDA 10. The battery 22 is held in place within this battery receiving recess by a cover 26. Those skilled in the art will understand that the PDA 10 may include a male power/data connector with the docking station 12 including a mating female connector or vice versa and that these connectors may take any form without departing from the scope of the invention.

As can be seen most clearly in FIGS. 1, 4 and 5, when received within the recess 14, a lower portion of the PDA 10 is entirely surrounded on three sides with a front face 25 of the PDA 10 exposed except for a bottom edge and lateral portions thereof which are covered by projections 27 of a wall 29 surrounding the recess 14. A lower portion of the portion of the PDA 10 holding the battery 22 is completely surrounded by the walls of the recess 14. However, as can be seen in FIGS. 1 and 5, the recess 14 includes a channel 30 which extends rearward from a back surface of the PDA 10 to form an open space behind the PDA 10 extending to the lower-most surface 18 of the recess 14. Those skilled in the art will understand that this channel 30 will not only serve to increase air flow around the adjacent portion of the PDA 10, but may also receive a hand strap, or other accessory attached to the PDA 10. Projections 32 grip the rearward edges of the PDA 10 to provide positive guidance of the PDA 10 and the connector 28 into alignment with the connector 20 as the PDA 10 is inserted into the recess 14. Those skilled in the art will understand that additional guiding features may be included in the docking station 12 according to the invention for mating with corresponding features on the device(s) to be received therein to further ensure proper alignment of the connectors 20 and 28. Extending rearward from the center of the wall 29 is a battery latch 31 which maintains a battery 22 in the desired position within a battery receiving station 52 which will be described below.

When the battery 22 of the PDA 10 is charged, heat is generated. This is a limiting factor in reducing the charging time as increasing the charging current to speed the charging involves a proportionate increase in the heat generated. For most mobile devices such as the PDA 10, when the battery 22 heats to a predetermined level, the device will shut down the recharging process to prevent damage thereto. For example, many devices include a thermal sensor which directs the device to stop charging when a predetermined temperature is reached. When additional guiding features sufficient to ensure proper mating of the connectors 20 and 28 are included in the docking station 12, portions of the walls of the recess 14 and, specifically, of the channel 30, not necessary to support these guiding features may be omitted to enhance cooling of the battery 22.

In addition, liquids spilled into the docking station 12 may short out the docking station and/or the PDA 10 further increasing downtime. To reduce spill related downtime and decrease the occurrence of overheating, the lower-most surface 18 may also include a well 34 extending downward from a contoured surface 36 which may, for example, correspond to a shape of the bottom surface 38 of the PDA 10. For example, as shown in FIGS. 7 and 8, the bottom surface 38 extends generally along a part of a curved surface (e.g., a cylinder) with the connector 28 extending along a substantially flat, substantially centered portion of the bottom surface 38. Behind the connector 28, a surface extending below the battery 22 includes a recess 40 with vents 42 to the battery receiving recess. Thus, the well 34 provides an air space below the vents 42 to promote circulation therethrough. In addition, the well 34 includes an opening 44 to a channel which extends to an opening 46 in a bottom surface 48 of the docking station 12. As can be seen in FIGS. 1, 2, 4 and 6, the docking station 12 includes four (4) feet 50 which raise the bottom surface 48 off the surface on which the docking station 12 is placed. Thus, the channel 30 is fluidly connected to the space beneath the docking station 12 and air circulation through the channel 30 is promoted via the opening 44 and the open, top end of the channel 30. In addition, as all portions of the lower-most surface 18 slope downward to the well 34 and the opening 44 is in the lowest part of the well 34, any liquid spilled into the docking station 12 will drain therefrom via the opening 44 and the channel. Those skilled in the art will understand that, if the docking station 12 is supported on a surface which is not horizontal (e.g., if it is wall mounted), the channel will preferably extend from the opening 44 to a lower surface of the docking station 12 whether or not this surface forms a base of the docking station 12.

As seen in FIG. 3, the docking station 12 includes a battery receiving station 52 located behind the channel 30. Specifically, the battery receiving station 52 is formed as a recess 58 in a rear portion of the docking station 12 configured to receive the battery 22 when it has been removed from the battery receiving recess of the PDA 10. That is, while a PDA 10 including a battery 22 is charging in the recess 14, a spare battery 22 may be charged in the battery receiving station 52. Thus, a lower-most surface 54 of the battery receiving station 52 includes a connector 56 similar to that included within the battery receiving recess of the PDA 10 for electrically coupling the battery 22 to the PDA 10. Those skilled in the art will understand that the connector 20 is coupled to the one or more ports (not shown) on the docking station 12 which may be coupled to sources of power and/or data via external cabling while it is necessary only to connect the connector 56 to a port supplying power. The recess 58 is preferably sized to allow a gap around the entire perimeter of the battery 22 when received therein with fins 60 maintaining a separation between the battery 22 and the walls of the recess 58. In addition, the lower-most surface 54 includes an opening 62 extending via a channel to an opening 64 in the bottom surface 48 of the docking station 12. Thus, air can circulate through the channel to the space between the battery 22 and the walls of the recess 58 to aid in cooling the battery 22 during charging. In addition, the opening 64 is preferably formed at the lowest point on the lower-most surface 54 so that, if liquid is spilled into the recess 58, it will drain therefrom via the opening 64.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A docking station for a portable electronic device including a rechargeable battery, the docking station comprising:
    a device receiving recess including a device receiving bottom surface and at least one device guiding structure sized to slidingly receive therein a device to be docked in the docking station and to guide the device toward, and maintain the device in, a desired position within the device receiving recess;
    an air flow channel which, when a device is received within the device receiving recess, is adjacent to a battery of the device, the air flow channel extending from an open top end to the device receiving bottom surface; and
    a first lumen extending through the device receiving bottom surface to establish fluid communication between the air flow channel and an exterior of the docking station.

2. The docking station according to claim 1, wherein the device receiving bottom surface includes a docking station connector for mating with a device connector on a device received in the device receiving recess and wherein a portion of the device receiving bottom surface immediately beneath the air channel forms a well extending downward from the docking station connector to form a space beneath a battery of a device received in the device receiving recess.

3. The docking station according to claim 2, wherein the first lumen extends from an opening at a lower-most point of the well.

4. The docking station according to claim 1, further comprising a battery receiving station including a battery recess configured to receive a battery from a device to be received within the device receiving recess, a battery receiving bottom surface of the battery recess including a battery connector configured to mate with connections on the battery, the battery recess being sized so that, when a battery is received therein a perimeter of the battery is separated from walls of the battery recess to permit air flow therearound.

5. The docking station according to claim 4, further including a plurality of fins extending from the walls of the battery recess to maintain a desired separation between the walls of the battery recess and a battery received therein.

6. The docking station according to claim 4, further comprising at least one fin for maintaining a desired separation between the battery and the battery receiving bottom surface.

7. The docking station according to claim 4, further comprising a second lumen extending through the battery receiving bottom surface establishing fluid communication between the battery receiving recess and an exterior of the docking station.

8. The docking station according to claim 7, wherein the second lumen extends from a lower-most point of the battery receiving bottom surface.

9. A docking station for a portable electronic device including a rechargeable battery, the docking station comprising:

a device receiving recess including a device receiving bottom surface and at least one device guiding structure sized to slidingly receive therein a device to be docked in the docking station and to guide the device toward, and maintain the device in, a desired position within the device receiving recess in which an electrical connector of the device mates with an electrical connector of the docking station;

a well formed in the bottom surface of the device receiving recess, the well extending downward from the electrical connector of the docking station to a drainage opening formed at a lower-most point of the well; and a first lumen extending from the drainage opening to an outlet at an exterior of the docking station.

* * * * *